United States Patent [19]
Müller et al.

[11] Patent Number: 6,080,054
[45] Date of Patent: Jun. 27, 2000

[54] DEVICE AND PROCESS FOR SEPARATING SAUSAGES

[75] Inventors: Gerhard Müller, Schemmerhofen; Karl Hummel, Biberach, both of Germany

[73] Assignee: Albert Handtmann Maschinenfabrik GmbH & Co. KG, Biberach, Germany

[21] Appl. No.: 09/263,290

[22] Filed: Mar. 5, 1999

[30] Foreign Application Priority Data

Mar. 9, 1998 [DE] Germany .......................... 198 10 046

[51] Int. Cl.⁷ .................................................. A22C 11/00
[52] U.S. Cl. .................................................. 452/49; 452/29
[58] Field of Search .................................. 452/49, 29, 30

[56] References Cited

U.S. PATENT DOCUMENTS 4,104,763  8/1978  Tetsuro .......................................... 452/49
4,214,492  7/1980  Hoffman ........................................ 452/49
4,366,600  1/1983  Townsend et al. ............................ 452/49

FOREIGN PATENT DOCUMENTS

440039    12/1993  European Pat. Off. .
3104099   9/1982   Germany ...................................... 452/49
3408859A1 9/1985   Germany .

*Primary Examiner*—Willis Little
*Attorney, Agent, or Firm*—Tilton, Fallon, Lungmus & Chestnut

[57] ABSTRACT

A separating device for separating sausages at division locations with at least two conveying belts moving into the same direction for transporting a sausage string and with at least two separator elements which are driven so that for cutting the sausage string they cooperate at division locations, and means which provide a distance between the conveying belts during the cooperation of the separator elements in the region of the division location to be separated which distance is greater than the diameter of the sausage, and a process for separating sausages.

24 Claims, 5 Drawing Sheets

DEVICE AND PROCESS FOR SEPARATING SAUSAGES

FIELD OF THE INVENTION

The invention relates to a separating device for separating sausages at division locations and a process for dividing sausage strings.

BACKGROUND OF THE INVENTION

A device of this kind is known e.g. from EP 0 440 039 B1. The sausage stuffing machine described therein presses sausage meat through a stuffing tube into a hose-like sausage casing. By means of a twisting mechanism, individual sausage portions are formed between which twisting locations, i.e. division locations, are situated. The thus formed sausage string is progressed by two conveying belts of a so-called lengthwise apparatus. In the course of this progression, the sausage string passes a separating device which separates the sausage string at the division locations into individual sausages or into groups of a defined number of sausages, respectively. In the device of this kind, for this purpose rotating separator elements are provided at both sides of the sausage string, which elements counterrotate on circular paths and comprise blades or corresponding countersupports, respectively, at the outer end. The separator elements are mounted such that the blades or the countersupports, respectively, cooperate at one point of their rotation such that the sausage string is separated at a division location. In the process, the transport speed of the sausage string and the rotational speed of the separator elements are synchronized or adapted to the product.

In particular when stuffing extremely bowed (bent) sausage skins, e.g. natural skins, in particular pork skins, the twisting locations are often situated decentrally with respect to the axis of the individual sausages. That is why it is desirable for the region reached by the separator elements crosswise to the sausages to be as large as possible, so that even these decentral division locations are separated. However, this region is limited by the distance between the conveying belts, i.e. the diameter of the sausages. In particular extremely bowed skin materials can slip through at the edge of the separator elements, so that the division location is not separated. In particular in highly automated production lines, the rejections resulting therefrom lead to a loss of material and possibly also a loss of time.

SUMMARY OF THE INVENTION

This object is solved by a separating device described in the precharacterizing part of claim 1 with the features of the characterizing part of claim 1 and a process described in the precharacterizing part of claim 22 with the features of the characterizing part of claim 22.

In the process according to the invention, the conveying belts transporting the sausage string to a separating device are during the cutting process moved apart to a distance larger than that of the diameter of the sausage. For this purpose, the device according to the invention comprises means which during the engagement of the two separator elements provide a distance between the conveying belts greater than that of the diameter of the sausage.

That means that during the cutting process the distance between the two conveying belts crosswise to the orientation of the sausage string is greater. This, for example e.g. makes possible a larger range of the separator elements crosswise to the orientation of the sausage string, so that even extremely decentrated division locations can be reached. In case of special centering elements being provided in addition to the separator elements, which are to center the division location before cutting, the greater distance enables these centering elements to reach a larger region cross-wise to the orientation of the sausage string, so that in this case, too, extremely decentrated division locations can be securely reached. As the greater distance between the conveying belts is only adjusted during the cutting process, and only in the cutting region, the time and the length during which the conveying belts are not lying close to the sausage string is only short, such that there is no risk of a slip between the sausage string and the conveying belts.

The separator elements can, for example, e.g. be shifted from the sides between the conveying belts against the division location and cut this location. A particularly secure and advantageous embodiment provides, however, that the separator elements counterrotate on circular paths about an axle each perpendicular to the direction of transport of the sausage string. Thus, a particularly gentle separation is possible, which reduces the risk of damaging the skin material.

For achieving a greater distance between the conveying belts, these can be moved apart, for example, by means of a sliding device or a rail. However, it is particularly advantageous if the spreading of the conveying belts is achieved by means of spreading elements which rotate together with the separator elements.

In one embodiment, for this purpose first and second spreading elements are provided which rotate with one of the two separator elements, one of the two spreading elements keeping apart a first conveying belt from the sausage string during the engagement of the first with the second separator element, and the other spreading element keeping apart a second conveying belt from the sausage string during the engagement of the first with the second separator element, so that during the engagement of the two separator elements the distance of the conveying belts is greater than the diameter of the sausage string.

In this embodiment according to the invention, both spreading elements can rotate together with the two separator elements on a common axle. This makes possible a particularly compact design and a simple manufacture, as only the one rotating separating head has to be equipped with corresponding spreading elements. On the other hand, the one spreading element can also be assigned to the one separator element and the other spreading element to the other separator element. Such an arrangement guarantees an equal load on the axles of rotation.

A particularly advantageous embodiment additionally comprises at least a third and a fourth separator element, the third separator element rotating together with the first separator element on an axle and the fourth separator element rotating together with the second separator element on an axle. During their engagement, the third and the fourth separator elements cooperate in the same way as the first and the second separator element in order to separate division locations. Third and fourth spreading elements serve for providing the greater distance between the conveying belts, when the third and the fourth separator elements are engaged, which spreading elements move apart the conveying belts analogous to the action of the first and second spreading elements, when the third and the fourth separator elements engage. Several separating and spreading elements which each together rotate on one axle, mean an equal load of the respective axles. Furthermore, a greater number of sausages can be separated within a shorter time. In the process, an arbitrary number of separator elements with a corresponding number of spreading elements can rotate on one axle. Particularly advantageously, however, two separator elements are provided per axle, which oppositely extend away from the axle, such that the individual separator elements do not impede each other.

In an advantageous design, the rotating spreading elements comprise a bevelled edge at the leading end with respect to the rotational direction, which comes between the respective conveying belt and the sausage string in order to remove the conveying belt from the sausage string. With such a bevel, the removal of the conveying belt from the sausage string is effected in a secure manner without a damaging of the conveying belt or the sausage string having to be feared.

For centering the division location, a form element can precede on the circular path in front of at least one of the two rotating separator elements which cooperate for separating two sausages. Such a preceding centering element also projects between the conveying belts in the region in which the conveying belts are moved apart by the spreading elements. In this manner, an unimpeded course of the centering elements is possible.

In the device according to the invention, form elements for centering can be applied, the dimension of which is greater than the diameter of a sausage. However, the spreading elements can also comprise a centering bevel which comes into contact with the sausage string when the respective spreading element comes between the sausage string and the conveying belt. Such a centering bevel results in a pre-centering of the division location, which results in an even more secure feed thereof to the separator elements.

Additionally, the form elements can be designed such that during the engagement of two separator elements the sausages to be separated have a sufficient distance. This is advantageous if material is processed which makes impossible a sufficient straightening of the division location between two sausages. If the form elements are, for example, formed of V-shaped surfaces extending crosswise to the sausage string, between two sausages at least the distance between the separator element and the form element preceding it ensues. By applying additional form elements, e.g. following the respective other separator element which cooperates with the first separator element for cutting the sausage string, a greater distance can also be achieved.

BRIEF DESCRIPTION OF THE DRAWINGS

In the following, an embodiment of the device according to the invention is described and the process according to the invention is illustrated. The Figures show.

DESCRIPTION OF THE PREFERRED EMBODIMENT

Figure 1:
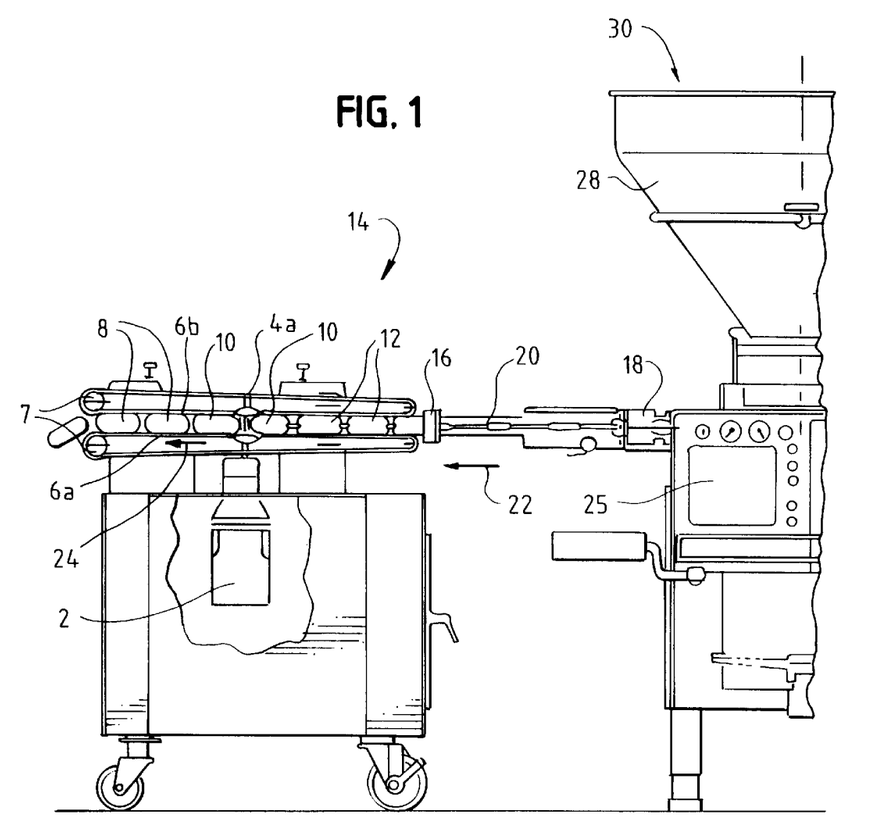
FIG. 1 a schematic general view of a sausage stuffing machine with a separating device according to the invention, FIG. 2 an example of a decentrated division location, FIG. 3 a side view of a sausage string during the separation in a separating device according to the invention, FIG. 4 a sausage string immediately before being separated in a separating device according to the invention.

The general view of a sausage stuffing machine in FIG. 1 shows a stuffing machine main part 30 with a stuffing hopper 28 for the sausage meat. Reference numeral 20 denotes a stuffing tube through which the sausage meat is ejected in the direction 22 by means of a vane-cell pump arranged in the machine main part 30 in a manner known. Reference numeral 16 denotes a brake ring gear, as is e.g. known from the European patent 0 232 812, which serves for slowing down the sausage casing. Reference numeral 18 denotes a twisting gear which is known for forming twisting locations between the individual sausages. Numeral 12 shows individual sausages which are connected to one another at the division locations, i.e. the twisting locations.

Reference numeral 4a, b denote separating heads of a separating device, only one separating head 4a being visible in this case. In the shown state, two sausages 10 are being separated. Numeral 2 denotes a motor, e.g. a highly dynamic motor the speed of which can be controlled, which drives the rotating separating heads 4a which are situated at both sides of the sausage string. In the process, the separating heads 4a and 4b are driven by the common motor 2 via a gear which is of no further interest in this context. Equally, two separate motors are applicable for the separator elements. Numeral 8 denotes already separated sausages. The sausage string or the sausages, respectively, are conveyed into the direction 24 by two endless belts 6a, b which are driven by deflection pulleys 7. The total of the endless belts with their drive and the separating device is named lengthwise apparatus 14.

A control system 25 serves for exactly phasing the motions of the endless belts 6a, 6b, the ejection of the stuffing material through the stuffing tube 20, the twisting gear 18 and the motor 2 of the separating device.

Figure 2:
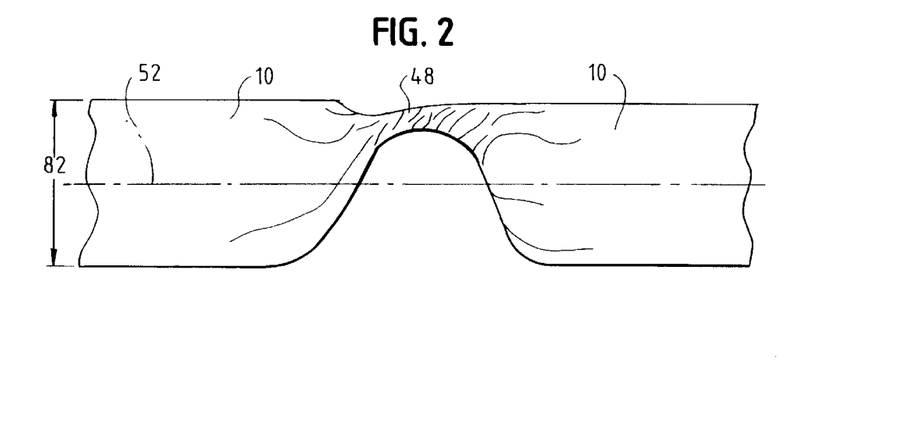

FIG. 2 shows the division location 48 between two sausages 10 to be separated which division location is off center with respect to the center axis 52 of the sausages. Numeral 82 denotes the diameter of the sausages.

Figure 3:
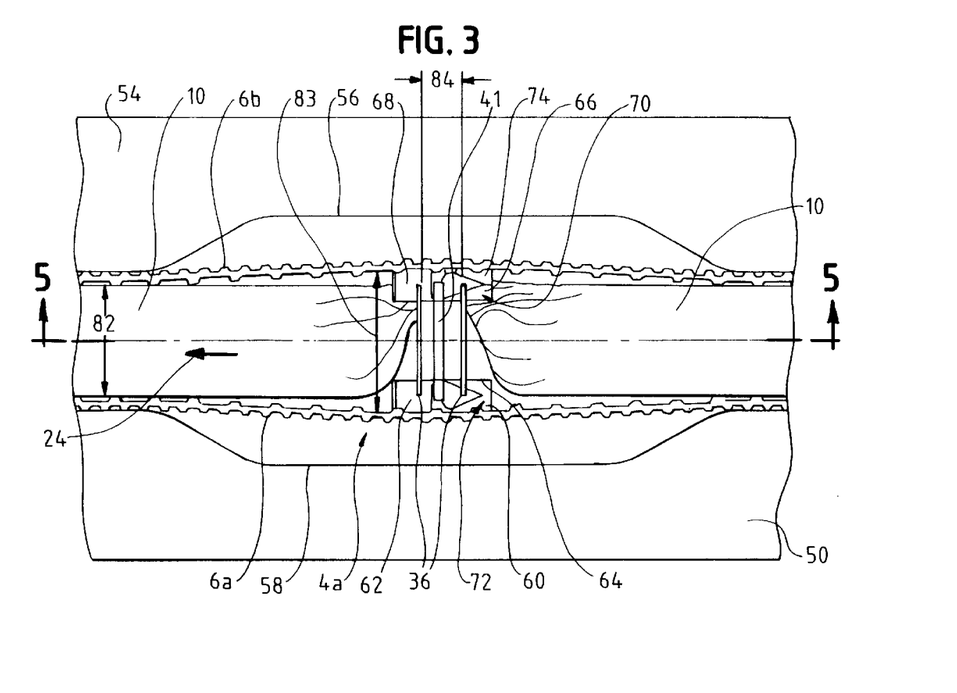

In FIG. 3, by means of an example, endless belts 6a and b are shown, which are equipped with additional ribs in order to reduce the slip between the endless belt and the sausage string. The endless belts 6a, 6b can be, for example, flexible belts which move along guides or holding devices 50, 54, respectively. These holding devices 50, 54 comprise recesses 56, 58 in the cutting region. While numeral 83 denotes the distance between the endless belts 6a and 6b in the cutting region, numeral 84 shows by way of example the distance between two sausages 10 during the separation process. This distance corresponds at least to the distance between a form element 36 and the separator elements being in contact.

Between the two sausages, in the view of FIG. 3, the separating head 4a can be seen. It comprises two lower spreading elements 62 and 60 and two upper spreading elements 68 and 66. Between these elements, there are separator elements 41 and 40 (which can not be seen in the perspective of FIG. 3), and platelike form elements 36. The exact design of the spreading elements 60, 62, 66, 68 is illustrated in detail with respect to FIGS. 5 to 9.

Figure 4:
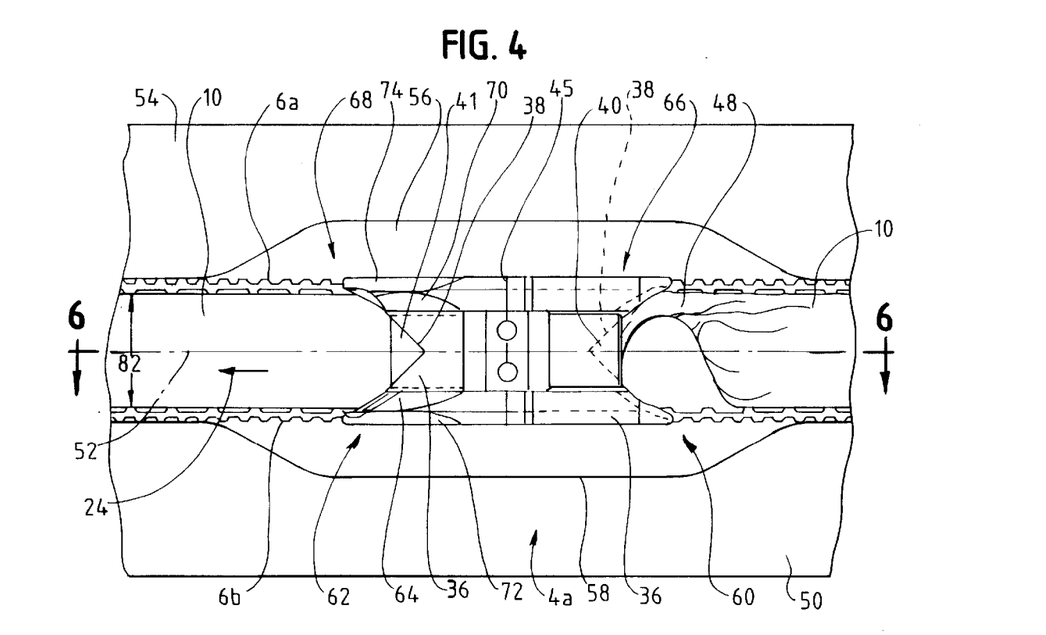

FIG. 4 shows the same perspective as FIG. 3, however at a time just before a division location 48 enters the cutting region. In this perspective, the V-shaped cutouts 38 of the form elements 36 can be seen. In contrast to FIG. 3, at the time shown in FIG. 4, the spreading elements are not situated between the conveying belts 6a, b.

Figure 5:
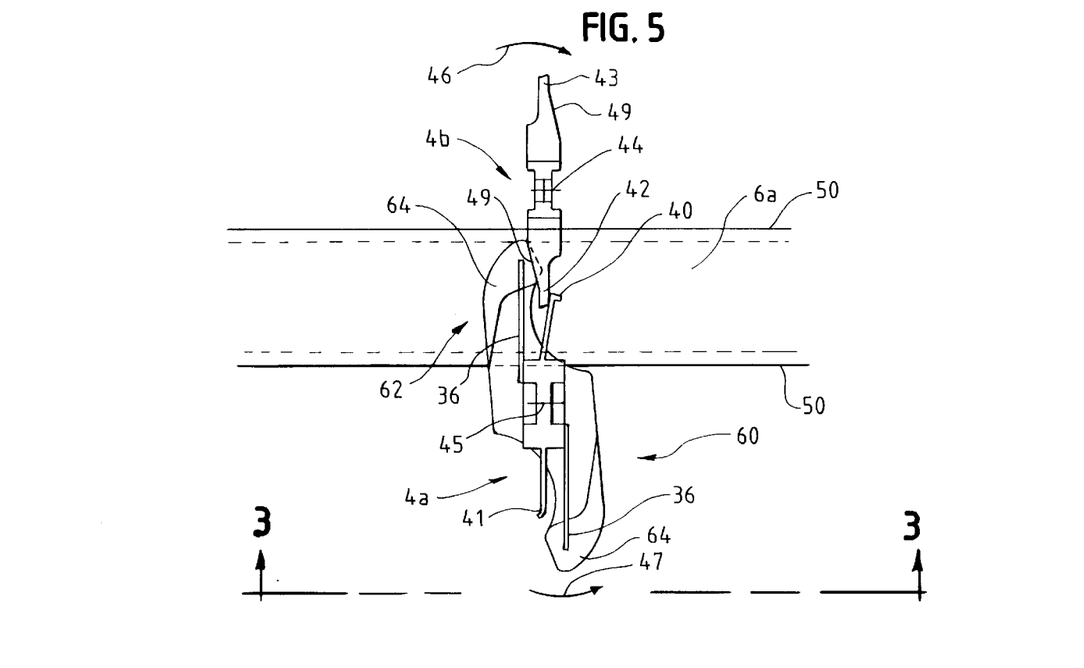
FIG. 5 a plan view on the lower region of a separating device according to the invention approximately at the level D of FIG. 3, FIG. 6 a plan view on the lower region of a separating device according to the invention approximately at the level D of FIG. 4, FIG. 7 a detailed view of a spreading element seen from the perspective D of FIG. 4, FIG. 8 the same spreading element of FIG. 7, rotated about the axis X by 180°, and FIG. 9a, b and c, respectively, views of the planes of section which result from the cut through the spreading element of FIG. 8 along the surfaces A, B and C, respectively.

In FIG. 5, a plan view on a plane of section is shown, which corresponds to the plane D of FIG. 3. The viewing direction of FIG. 3 is denoted with E in FIG. 5. FIG. 5 correspondingly shows the lower region of a separating device according to the invention during the engagement of two separator elements. In order to render the FIGURE more clear, the sausage string is not shown. The separating head 4a rotates in the direction 47 about the axle 45. Each spreading element 60, 62 comprises a centering bevel 64 which comes into contact with the leading sausage of the two sausages to be separated and serves for pre-centering the division location 48. Numeral 36 denotes form elements which are formed of plane elements in the shown embodiment, which essentially extend in parallel to a line perpendicularly intersecting the axle 45. The V-shaped design of the form elements 36 can be seen in FIG. 4. The V-shaped regions 38 of the form elements 36 can be embodied to be adjustable or in one piece. The separating head 4a supports two countersupports 40, 41 arranged opposite each other and mounted elastically. The countersupport 40 is engaged with one of the two blades 42, 43 of the second separating head 4b. The second separating head 4b rotates about an axle 44 in the direction 46. On each of the leading sides of the separating head 4b, a concave surface 49 can be provided, which comes into contact with the leading sausage and thus avoids a damaging of the sausage casing. Different from the shown embodiment, both separating heads 4a, b can be equipped with blades which engage in the cutting region. Furthermore, additional form elements can be provided at the second separating head 4b, which follow the blades 42, 43, such that the sausages are held at a defined distance by a form element 36 of the first separating head 4a and a form element of the separating head 4b during the separation process.

Figure 6:
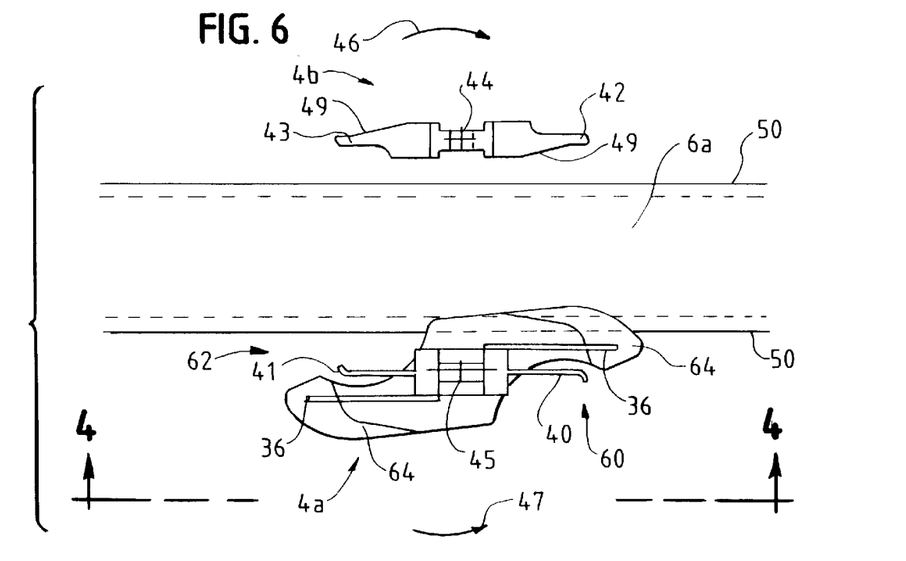

In FIG. 6, a perspective corresponding to FIG. 5 at a time corresponding to FIG. 4 is shown, i.e. at a time just before two sausages 10 are to be separated. As in FIG. 5, the sausage string is not shown in order to render the Figure more clear. FIG. 6 shows a sectional view corresponding to the plane D of FIG. 4. Correspondingly, FIG. 6, too, only shows the lower region of the separating device according to the invention. The perspective of FIG. 4 is denoted with E in FIG. 6.

Figure 7:
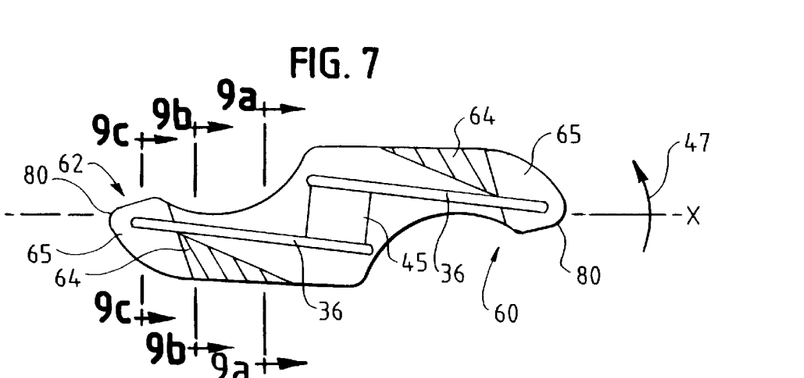

In FIG. 7, the spreading elements 60, 62 are shown in detail, the perspective corresponding to FIG. 5 and FIG. 6, respectively. Numeral 80 denotes the rounded corners which radially project over the form elements 36. In the embodiment shown in FIG. 7, the centering bevel 64 consists—in contrast to the embodiment shown in FIG. 5 and FIG. 6, respectively—of a bevelled region which is shown in shaded lines and a plane region 65 oriented essentially perpendicularly to the axle 45.

Figure 8:
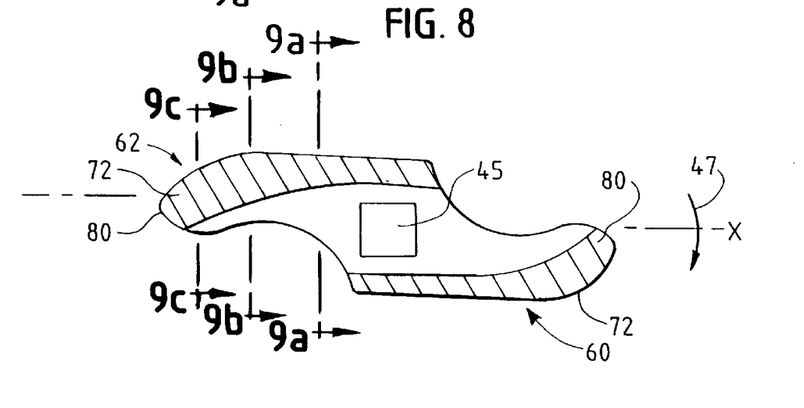

FIG. 8 shows the same spreading element, rotated about the axis X of FIG. 7 by 180°. In the forward direction, the bevels 72 are shown which come into contact with the conveying belt 6a.

Figure 9A:
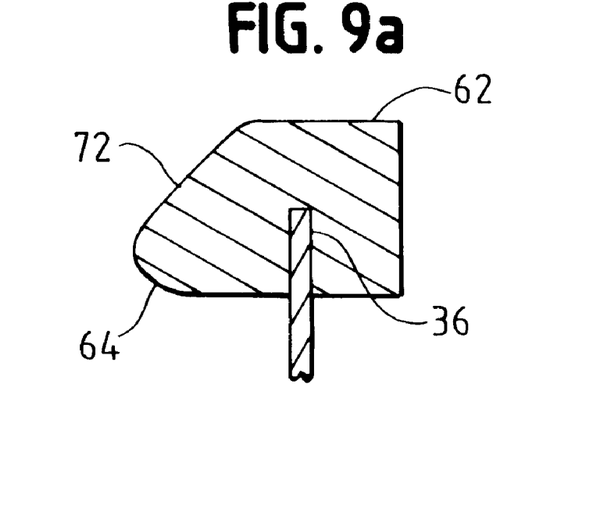
Figure 9B:
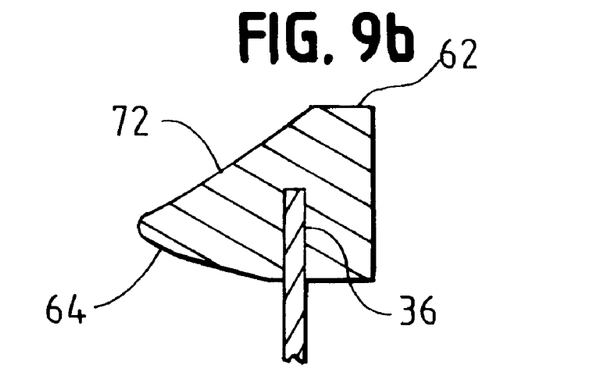
Figure 9C:
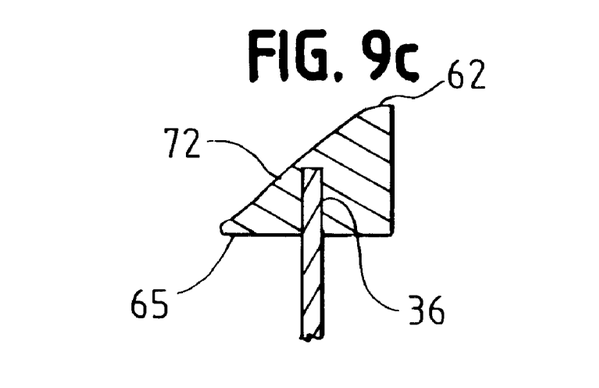

In FIG. 9, those surfaces are shown which result when the spreading element 62, as can be seen in FIG. 8, is cut along the plane A and viewed from this perspective. The FIGS. 9b and c correspond to the planes of section B and C of FIG. 8.

FIGS. 5 to 9 each show the lower spreading elements 60, 62. The upper spreading elements 66, 68 (see FIGS. 3,4) comprise a mirrored design which is otherwise analogous. In the upper spreading elements, the centering bevels 70 correspond to the centering bevels 64, and in the upper spreading elements 66, 68, the leading bevels 74 correspond to the leading bevels 72 of the lower spreading elements 60, 62.

In both shown embodiments, all spreading elements 60, 62, 66, 68 are situated at the first separating head 4a. The spreading elements, however, can also be apportioned to the separating heads 4a and 4b. Thus, for example, the upper spreading elements can be situated at the first separating head 4a, while the lower spreading elements are situated at the second separating head 4b. It is also imaginable that at each separating head only one upper and one lower spreading element are arranged one above the other such that, when two separator elements each are engaged, only the spreading elements of one separating head is situated between the conveying belts 6a, 6b.

The denotations "upper" and "lower" in this description refer to the perspective of FIGS. 1, 3 and 4 and are not to be interpreted as restricting. In the mentioned Figures, the axles 44, 45 are oriented perpendicularly. Any other orientation is also possible, e.g. a horizontal orientation of the axles, such that the separator elements grip between the sausages 10 from the top and from the bottom and that the conveying belts 6a, 6b are situated laterally of the sausages.

With the shown embodiment of the device according to the invention, the process according to the invention is as follows. Sausage meat is introduced into the stuffing machine main part 30 through the hopper 28. The vane-cell pump (not shown) presses the sausage meat through the stuffing tube 20 into the direction 22. In the process, in a manner known a sausage casing provided on the stuffing tube is stuffed and simultaneously pulled off the stuffing tube 20. The casing material stuffed with sausage meat is taken hold of by the endless belts 6a, b of the length-wise apparatus 14, which are driven by the deflection pulleys 7 in the direction 24. After the ejection of one sausage meat portion corresponding to one sausage, the ejection of stuffing material is stopped or slowed down synchroneously with the endless belts 6a, b. The stuffed part of the pulled off casing material is held by the endless belts 6a, b while the twisting gear 18 rotates the stuffing tube 20 together with the not yet stuffed part of the casing material situated on the stuffing tube.

In this manner, a division location 48 is generated by twisting. In order to guarantee a sufficient tension of the casing material, a brake ring gear 16, which is of no further interest in this context, is provided. The sequence of the movement of the vane-cell pump in the machine main part 30, the twisting gear 18, the brake ring gear 16 and the endless belts 16a, b is effected by the control system 25, which transmits corresponding signals to the individual components in a manner of no further interest here.

By means of the endless belts 6a, b, the portions of the sausage string twisted to form individual sausages 12 are passed by the separating device, the separating heads 4a, b of which laterally engage between the endless belts 6a, b, as can be seen in FIG. 3 and FIG. 5, respectively. The motor 2 of the separating device, which drives the two separating heads 4a and 4b, is also driven by the control system 25 to perform a corresponding synchronous motion. The phase positions of the individual movements are calculated and predetermined from parameters, such as the desired amount of portion, the stuffing speed, the diameter or the desired number of sausages which together are to form a sausage chain, by means of the control system 25.

The separating heads 4a, 4b divide the sausage string at the division locations 48, so that individual sausages 8 result therefrom which are further conveyed by the endless belts 6a, b, until they fall into a reservoir at the end of the lengthwise apparatus 14 or are further processed. The separating heads 4a, 4b can rotate at a uniform speed. Depending on the speed of the sausage string and the distance of the division locations 48, however, it can be necessary for the control system 25 to change the angular velocity of a separating head 4a, 4b during one rotation thereof. For example, in case of longer sausages, which are conveyed at high speeds by the endless belts 6a, b, only during the period of time during which the separator elements are in contact with the sausage string, the rotational speed of the separating heads 4a, 4b will be adapted corresponding to the speed of the sausage string, while during the period of time during which no separator element is in contact with the sausage string, the rotational speed is adjusted to be slower in order to be able to separate longer sausages.

If now a division location 48 comes out of a position, as it is shown in FIG. 4, into a cutting region of the separating device, due to the rotation of the separating head 4a, a spreading element 60, 62 is shifted between the division location and the lower conveying belt 6a. In the process, the centering bevel 64 moves against the leading sausage. Due to the bevel, a damaging of the sausage skin is avoided. On the other hand, the bevel 72 moves against the lower conveying belt 6a. Due to the further rotation of the separating head 4a, the conveying belt 6a is spread away from the sausage string. In the same manner, the corresponding spreading element of the upper spreading elements 66, 68 cooperates with the upper conveying belt 6b and the sausage string. In FIG. 3 and FIG. 5, respectively, the spreading elements 62 and 68 are being engaged with the conveying belts 6a and 6b, while the spreading elements 60, 66 extend away from the sausage string.

The centering bevels 64 and 70, respectively, of the spreading elements 60, 62 and 66, 68, respectively, take care of a secure introduction of the division location 48 into the V-shaped regions 38 of the form elements 36, the side view of which can be seen in FIG. 3. As the conveying belts 6a, 6b are spread by means of the spreading elements, in this manner even those division locations 48 can be reached which are very decentrated. The V-shaped opening region 38 of the centering elements 36 can in this manner be further opened than corresponds to the diameter 82 of the sausages. Even if this is not the case, by means of the centering bevels 64, 70, it is guaranteed that very off center division locations 48 are reached.

If the separating heads 4a and 4b are in the position of FIG. 5, the minimum distance between the two sausages to be separated is determined by the distance between the form element 36 which precedes the countersupport 40 and the separator elements 40, 42 which are engaged. If different from the shown embodiment further form elements are provided, one of which follows the countersupport 40, the distance of a leading form element to a following form element determines the minimum distance of the sausages during the separation process.

If the separating head 4a is in the position of FIG. 5 or FIG. 3, respectively, the separating head 4b is in the position of FIG. 5. By means of the centering elements 36, the division location 48 is centered at least to such an extent that it can be reached by the blade 42 or the countersupport 40, respectively. The blade 42 cuts the division location 48 against the countersupport 40, which is elastically mounted. The elastic mounting enables a resilience of the countersupports 40, 41, such that a smooth course of the cutting process is guaranteed. Due to the very flatly bevelled or horizontal region 65, respectively, of the centering bevel 64, it is in this case guaranteed that the spreading elements do not impede the movement of the blades 42, 43 of the separating head 4b during the engagement.

The separated sausage is further conveyed by the conveying belts 6a, 6b. The separating heads 4a, 4b further rotate, such that the conveying belts 6a, 6b are no longer spread, when the separating heads 4a, 4b are in the position of FIG. 6 or FIG. 4, respectively. In this manner, a slip between the sausages to be transported and the endless belts 6a, 6b is avoided.

The spreading of the conveying belts 6a, 6b is enabled by the recesses 56, 58 in the guides 50, 54.

Due to the moving apart of the conveying belts 6a, 6b, the device according to the invention and the process according to the invention enable a secure reaching of off center division locations 48. Furthermore, the moving apart of the conveying belts make possible the use of separator elements of a sufficient breadth and centering elements which reach a sufficiently large region crosswise to the sausage string. At the same time, the device according to the invention guarantees that the conveying belts 6a, 6b do not impede the cycle of movement of the separating heads 4a, 4b.

What is claimed is:

1. A separating device for separating sausages at division locations formed between individual sausages of a sausage string, comprising in combination at least two conveying belts moving into the same direction for receiving the sausage string between them and transporting it, at least one first separator element arranged on a first side of the sausage string, and at least one second separator element arranged on the second side of the sausage string, said separator elements being driven such that they cooperate for separating the sausage string at division locations, and means (60, 66) for providing a distance (83) between said conveying belts (6a, 6b) in the region of the respective division location (48) to be separate during the engagement of the two said separator elements (40, 42), which distance is greater than the diameter of the sausage (82).

2. A separating device according to claim 1, wherein said at least one first separator element (40) rotates on circular paths about a first axle (45) and said at least second separator element (42) counterrotates on circular paths about a second axle (44), said axles (44, 45) being perpendicular to the direction of transport (24) of the sausage string (10, 12).

3. A separating device according to claim 2, wherein said means for providing the distance comprise a first spreading element (60) rotating together with one of the two said separator elements (40, 42) and a second spreading element (66) rotating together with one of the two said separator elements (40, 42), one of the two said spreading elements (60, 66) keeping apart a first of said conveying belts (6a) from the sausage string (10, 12) during the engagement of the first said separator element with the second said separator element, and the other of said two spreading elements (66, 60) keeping apart a second of said conveying belts (6b) from the sausage string (10, 12) during the engagement of the first said separator element with the second said separator element.

4. A separating device according to claim 3, wherein said first and said second spreading elements (60, 66) rotate together with said first separator element (40) about a first common axle (45).

5. A separating device according to claim 3, wherein said the first and said second spreading elements rotate together with said second separator element (42) on a second common axle (44).

6. A separating device according to claim 3, wherein one of said spreading elements rotates together with said first separator element (40) on said first common axle (45) and one of said spreading elements rotates together with said second separator element (42) on said second common axle (44).

7. A separating device according to claim 6, and including at least one third separator element (41) rotating together with said first separator element (40) on said first common axle (45), at least one fourth separator element (43) rotating together with said second separator element (42) on said second common axle (44) on the other side of the sausage string (10, 12), said third and fourth separator elements (41, 43) cooperating during the rotation such that the sausage string (10, 12) is separated at division locations (48), said at least one third spreading element (62) rotating together with either said third or said fourth separator element, said at least one fourth spreading element (68) rotating together with either said third or said fourth separator element, and wherein one of said third and fourth spreading elements (68) keeps apart said first conveying belt (6a) from the sausage string (10, 12) during the engagement of said third separator element (41) with said fourth separator element (43), and the respective other one of said third and fourth spreading elements keeping apart said second conveying belt (6b) from the sausage string (10, 12) during the engagement of said third separator element (41) with said fourth separator element (43).

8. A separating device according to claim 7, wherein said third and the fourth spreading elements (62, 68) rotate together with said third separator element (41) on said first common axle (45).

9. A separating device according to claim 7, wherein said third and the fourth spreading elements rotate together with said fourth separator element (43) on said second common axle (44).

10. A separating device according to claim 7, wherein one of said third and fourth spreading elements rotates together with said third separator element (41) on said first common axle (45) and the other one of said third and fourth spreading elements rotates together with said fourth separator element (43) on said second common axle (44).

11. A separating device according to claim 7, 8, 9, or 10, and wherein exactly two said separator elements (42, 43; 40, 41) are provided per common axle (44, 45) and which from the respective said common axle (44; 45) extend away from one another in essentially opposite directions.

12. A separating device according to claim 3, wherein said spreading elements (60, 62, 66, 68) comprise a bevel (72, 74) leading with respect to the direction of rotation, which during the rotation moves between the respective said conveying belt (6a, 6b) and the sausage string (10, 12) to be kept apart, said bevel (72, 74) coming into contact with said conveying belt (6a, 6b) such that said conveying belt is moved away from the sausage string.

13. A separating device according to claim 10, wherein said spreading elements (60, 62, 66, 68) extend further away from the respective said common axle than the respective said separator elements.

14. A separating device according to claim 13, wherein the ends (80) of said spreading elements (60, 62, 66, 68) remote from said common axle are rounded.

15. A separating device according to claim 3, wherein said spreading elements (60, 62, 66, 68) comprise a centering bevel (64,70) on the side facing said respective separator elements (40,41, 42, 43) in order to feed the division location (48) to the respective said separator element.

16. A separating device according to claim 15, wherein at least one of said two separator elements which cooperate for separating two sausages (10) is preceded by a form element (36) on said circular paths, which form element centers the division location (48) between the two sausages (10) to be separated before the separation.

17. A separating device according to claim 16, wherein said form element (36) comprises at its end remote from said common axle an essentially V-shaped centering region (38) opening into the direction of the sausage string (10,12).

18. A separating device according to claim 17, wherein said V-shaped centering region (38) comprises an opening region which is at least as large as the diameter (82) of the sausage string (10, 12).

19. A separating device according to claim 16, wherein said form element (36) is embodied such that during the engagement of two said separator elements the respective sausages (10) to be separated comprise a determined distance.

20. A separating device according to claim 1, wherein said separator elements (40, 41, 42, 43) extend perpendicularly to the sausage string (10, 12) over a breadth corresponding at least to the diameter (82) of the sausage string (10, 12).

21. A separating device according to claim 1, wherein one (42, 43) of said two separator elements, which cooperate for separating two sausages (10), comprises a blade and the respective other one (40, 41) of said two separator elements comprises one of a countersupport or another blade.

22. An improved process for separating sausage strings at division locations into individual sausages or sausage chains with equal numbers of sausages, the sausage string being advanced to a separating device by means of conveying belts and cut at division locations, the improvement comprising the step of moving apart the conveying belts (6a, 6b) during the cutting process in the region of the division location (48) to be separated to a distance (83) greater than the diameter of the sausage (82).

23. The improved process according to claim 22, and the step of simultaneously centering the division location (48) to be separated, with the moving apart of the conveying belts (6a, 6b).

24. The improved process according to claim 21 or 23, and the additional step of, during the step of moving apart of the conveying belts (6a, 6b). providing a defined distance between the sausages (10) to be separated, before the division location (48) is cut.

* * * * *